US012388176B2

(12) United States Patent
Buchanan et al.

(10) Patent No.: US 12,388,176 B2
(45) Date of Patent: Aug. 12, 2025

(54) PHASED ARRAY OF ELECTROLYTIC FLUID ANTENNAS AND A METHOD FOR DYNAMICALLY BEAM STEERING THE SAME

(71) Applicant: United States of America as represented by the Secretary of the Navy, San Diego, CA (US)

(72) Inventors: Kristopher Ryan Buchanan, San Diego, CA (US); Timi Adeyemi, San Diego, CA (US); Carlos F. Flores-Molina, San Diego, CA (US); Sara Wheeland, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 336 days.

(21) Appl. No.: 18/186,308

(22) Filed: Mar. 20, 2023

(65) Prior Publication Data

US 2024/0322426 A1 Sep. 26, 2024

(51) Int. Cl.
*H01Q 3/36* (2006.01)
*H01Q 1/28* (2006.01)
*H01Q 1/34* (2006.01)

(52) U.S. Cl.
CPC ................. *H01Q 3/36* (2013.01); *H01Q 1/28* (2013.01); *H01Q 1/34* (2013.01)

(58) Field of Classification Search
CPC ............... H01Q 3/36; H01Q 1/28; H01Q 1/34
USPC .......................................................... 342/372
See application file for complete search history.

(56) References Cited

U.S. PATENT DOCUMENTS 8,368,605 B1 * 2/2013 Tam ....................... H01Q 1/364 343/788
10,050,352 B1 * 8/2018 Flores-Molina ..... H01Q 3/2623
10,074,908 B1 * 9/2018 Buchanan .............. H01Q 21/20
2009/0023383 A1 * 1/2009 Mesecher ................ H01Q 3/30 455/3.02

FOREIGN PATENT DOCUMENTS

CN 115275644 A * 11/2022
KR 2023/0001064 A * 1/2023

OTHER PUBLICATIONS

D. Jenn, Loke Y, Chin M., Choon Y., Siang O. and Yam Y., "Distributed phased arrays and wireless beamforming networks," Intl. Jour of Distributed Sensor Networks, vol. 5: p. 283-302, Jul. 2009.

(Continued)

*Primary Examiner* — William Kelleher
*Assistant Examiner* — Samarina Makhdoom
(74) *Attorney, Agent, or Firm* — Naval Information Warfare Center Pacific; Kyle Eppele; J. Eric Anderson

(57) ABSTRACT

A phased array of electrolytic fluid antennas comprising: a plurality of electrolytic fluid antennas, wherein each electrolytic fluid antenna is configured to produce a free-standing stream of electrolytic fluid from a corresponding nozzle; wherein each of the electrolytic fluid antennas is fed by magnetic induction by a corresponding current probe; and wherein the electrolytic fluid antennas are disposed with respect to each other so as to form a volumetric-array configuration such that not all of the nozzles are positioned within the same plane.

10 Claims, 5 Drawing Sheets

(56) References Cited

OTHER PUBLICATIONS

X. Pan, Z. Hu, M. Zheng, Z. Ren and Q. Chen, "A UHF sea water array antenna for maritime wireless communications," 12th European Conference on Antennas and Propagation (EuCAP 2018), London, UK, pp. 1-3, 2018.

Kristopher Buchanan, John Rockway, Oren Sternberg, and Nam Nicholas Mai, "Sum-Difference Beamforming for Radar Applications Using Circularly Tapered Random Arrays," IEEE Radar Conference, 2016.

James Andrews and Carlo H. Sequin, "Type-Constrained Direct Fitting of Quadric Surfaces," Computer-Aided Design and Applications, 2013.

Christopher R. Buchanan et al., "Analysis of Collaborative Beamforming for Circularly Bound Random Antenna Array Distributions," Technical Report, Naval Information Warfare Center Pacific (NIWC Pacific) San Diego, 2020.

Drew Overturf et al., Investigation of Beamforming Patterns from Volumetrically Distributed Phased Arrays,: Milcom 2017 Track 1—Waveforms and Signal Processing, 2017.

Nam Nicholas Mai, Kristopher Buchanan, Jeffrey Jensen, and Gregory Huff, "Distributed Beamforming from Triangular Planar Random Antenna Arrays," Milcom 2015 Track 1—Waveforms and Signal Processing, 2015.

T. Adeyemi, K. Buchanan and C. Flores, "Investigation and measurement of a sea water antenna array," 2017 United States National Committee of URSI National Radio Science Meeting (USNC-URSI NRSM), Boulder, CO, USA, 2017.

C. Hua, Z. Shen and J. Lu, "High-Efficiency Sea-Water Monopole Antenna for Maritime Wireless Communications," in IEEE Transactions on Antennas and Propagation, vol. 62, No. 12, pp. 5968-5973, Dec. 2014.

Eberspacher et al.; "Leaky wave antenna with amplitude controlled beam steering based on composite right/left-handed transmission lines," Adv. Radio Sci., 8, 27-32, 2010.

K. H. Sayidmarie and B. J. M. Jasem, "Amplitude-only beam scanning in linear antenna arrays," 2010 7th International Multi-Conference on Systems, Signals and Devices, Amman, Jordan, 2010.

Sebastien Rondineau, Stefania Romisch, Darko Popovic, Zoya Popovic, "Multibeam Spatially-Fed Antenna Arrays with Amplitude-Controlled Beam Steering," Proceedings of the 2003 Antenna Applications Symposium [27th] Held in Monticello, Illinois on Sep. 17-19, 2003.

* cited by examiner

0
-5
-10
-15
-20
-25
-30

PHASED ARRAY OF ELECTROLYTIC FLUID ANTENNAS AND A METHOD FOR DYNAMICALLY BEAM STEERING THE SAME

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 112196.

BACKGROUND OF THE INVENTION

An electrolytic fluid antenna, such as is described in U.S. Pat. No. 7,898,484, which issued 1 Mar. 2011, is similar in operation to a dipole antenna and similarly produces an equivalent omnidirectional radiation pattern. The electrolytic fluid antenna works in the following fashion: electrolytic fluid, such as sea water, placed in motion of a time harmonic alternating magnetic field creates an electric current conduction capable for the reception and transmission of radio frequency (RF) communication. Alternatively, the phenomena may be described as a correlation of Faraday's law, which in this application describes two different events: the motional electromotive force (EMF) or Lorentz force generated by a magnetic force on a moving conductor (e.g., charged ions in the sea water), and a transformer EMF generated by the electric force caused due to a changing magnetic field induced from the ferrite core excited by the electrolytic antenna's current probe. There is a need for an improved antenna design.

SUMMARY

Described herein is a phased array of electrolytic fluid antennas and a method for dynamically beam steering the same. One embodiment of the phased array of electrolytic fluid antennas comprises a plurality of electrolytic fluid antennas. Each electrolytic fluid antenna is fed by magnetic induction by a corresponding current probe and is configured to produce a free-standing stream of electrolytic fluid from a corresponding nozzle. The electrolytic fluid antennas are disposed with respect to each other so as to form a volumetric-array configuration such that not all of the nozzles are positioned within the same plane.

One embodiment of the method for dynamically beam steering a phased array of electrolytic fluid antennas is described herein as comprising the following steps. One step provides for forming a plurality of electrolytic fluid antennas by pumping electrolytic fluid through central openings of respective ferromagnetic current probes such that each electrolytic fluid antenna comprises a column of electrolytic fluid fed by magnetic induction. Another step provides for positioning the plurality of electrolytic fluid antennas in a three-dimensional, volumetric array so as to create a phased array, wherein not all of the electrolytic fluid antennas are positioned within the same plane. Another step provides for using a computer to morph the three-dimensional, volumetric array into configurations having different topologies.

Another embodiment of the method for dynamically beam steering a phased array of electrolytic fluid antennas is described herein as comprising the following steps. The first step provides for respectively mounting a plurality of electrolytic fluid antennas to a plurality of aerial vehicles. Another step provides for positioning the plurality of aerial vehicles in a three-dimensional, volumetric array so as to create a phased array of electrolytic fluid antennas, where not all of the electrolytic fluid antennas are positioned within the same plane. Another step provides for repositioning the aerial vehicles to selectively morph the three-dimensional, volumetric array into different topologies including a line, a ring, a circle and a sphere.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed antenna and method of beam steering the same described herein may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
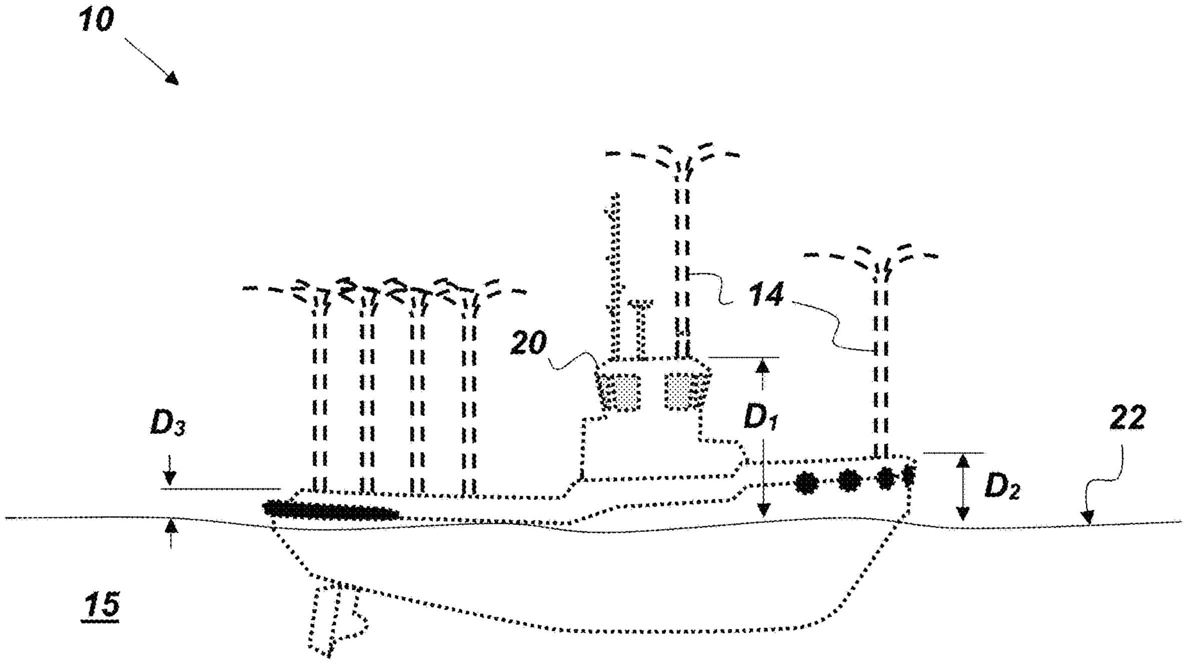
FIG. 1A is a side-view illustration of an embodiment of a phased array of electrolytic fluid antennas.
Figure 1B:
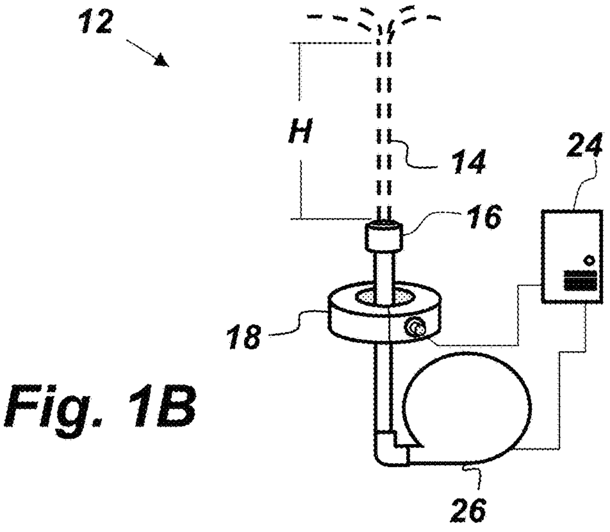
FIG. 1B is an illustration of an embodiment of an electrolytic fluid antenna.

FIG. 1A is a side-view of an embodiment of a phased array of electrolytic fluid antenna, hereinafter referred to as phased array 10, that comprises, consists of, or consists essentially of a plurality of electrolytic fluid antennas 12. FIG. 1B is an illustration of a single electrolytic fluid antenna 12. Each electrolytic fluid antenna 12 is configured to produce a free-standing stream 14 of electrolytic fluid 15 from a corresponding nozzle 16 (as shown in FIG. 1B). Each of the electrolytic fluid antennas 12 is fed by magnetic induction by a corresponding current probe 18. The electrolytic fluid antennas 12 are disposed with respect to each other so as to form a volumetric-array configuration such that not all of the nozzles 16 are positioned within the same plane. In the embodiment of the phased array 10 shown in FIG. 1A, the electrolytic fluid antennas 12 are mounted to a boat 20 at different distances D from a water surface 22. It is to be understood that that the constituent electrolytic fluid antennas 12 of phased array 10 do not all need to be mounted to the same platform but may be mounted to different platforms but still function together as the phased array 10.

Each electrolytic fluid antenna 12 may be communicatively coupled to a computer 24 such that the height H of each free-standing stream 14 and the power applied to each electrolytic fluid antenna 12 is controlled by the computer 24. All the electrolytic fluid antennas 12 in the phased array 10 may be communicatively coupled to the same computer 24 or to different computers that are in communication with each other. In the embodiment of the phased array 10 shown in FIG. 1A, the electrolytic fluid 15 is seawater that may be pumped through the current probe 18 with a pump 26 such that the electrolytic fluid exiting the nozzle 16 forms the free-standing stream 14.

Figure 2:
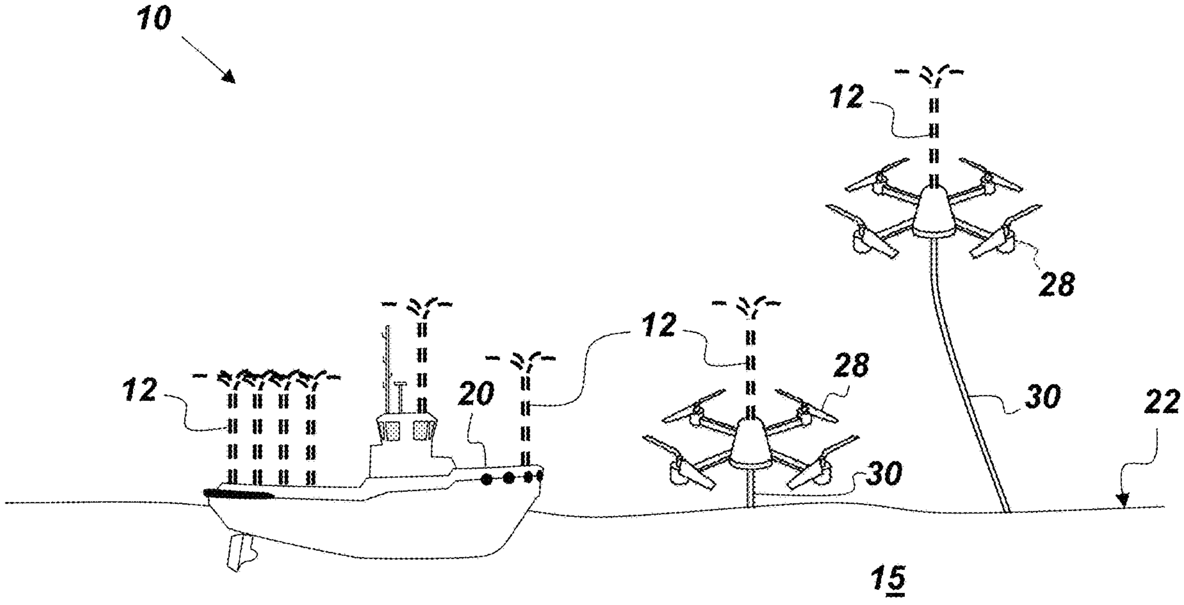
FIG. 2 is an illustration of an embodiment of a phased array of electrolytic fluid antennas.

FIG. 2 is an illustration of an embodiment of the phased array 10 where at least two of the electrolytic fluid antennas 12 are mounted to respective aerial vehicles 28, each of which includes a pump 20 to draw electrolytic fluid 15 (e.g., seawater, brackish water, etc) through an intake tube 30 and force it out of the nozzle(s) 16 of the electrolytic fluid antenna(s) 16 mounted thereon. Alternatively, the aerial vehicles 28 may be equipped with storage tanks of electrolytic fluid 15 that may be used to create the free-standing streams 14. Electrolytic fluid antennas 12 mounted on aerial vehicles 28 may be used alone, or in conjunction with other electrolytic fluid antennas mounted on other platforms, to form any desired shape to allow for beam-forming of the phased array 10.

Figure 3A:
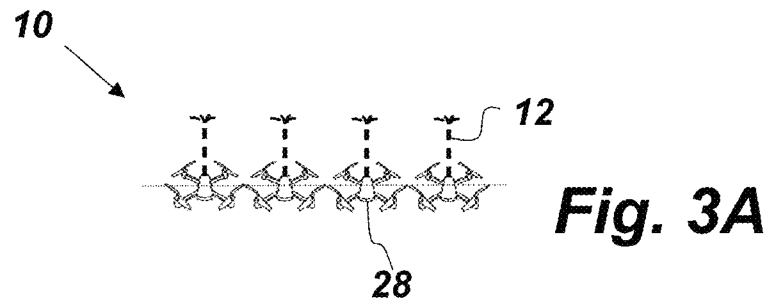
FIG. 3A is a perspective-view illustration of an embodiment of a phased array of electrolytic fluid antennas arranged in a linear configuration.
Figure 3B:
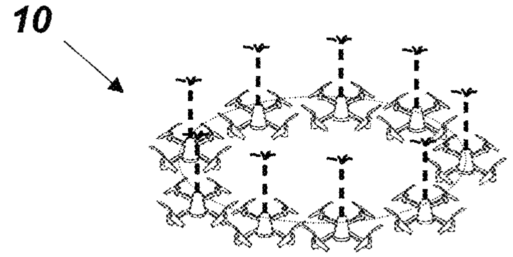
FIG. 3B is a perspective-view illustration of an embodiment of a phased array of electrolytic fluid antennas arranged in a ring configuration.
Figure 3C:
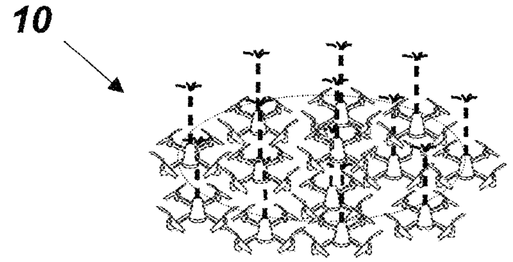
FIG. 3C is a perspective-view illustration of an embodiment of a phased array of electrolytic fluid antennas arranged in a circle/disc configuration.
Figure 3D:
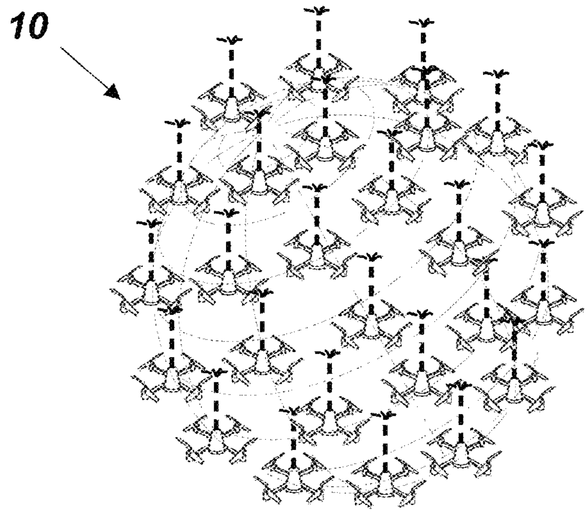
FIG. 3D is a perspective-view illustration of an embodiment of a phased array of electrolytic fluid antennas arranged in a spherical configuration.

FIGS. 3A, 3B, 3C, and 3D show a plurality of aerial vehicles 28 equipped with electrolytic fluid antennas 12 being morphed into different shapes/topologies. FIG. 3A shows the aerial vehicles 28 arranged in a straight-line configuration/topology. FIG. 3B shows the aerial vehicles 28 arranged in a ring configuration. FIG. 3C shows the aerial vehicles 28 arranged in solid disc configuration. FIG. 3D shows the aerial vehicles 28 arranged in a spherical configuration. Any desired shape may be approximated. The phased array 10 may be configured to create a volumetric array. A volumetric array can be defined as being distributed to a volume of space composed of three-dimensions: height, width and depth. The same aerial vehicles 28 may be controlled by the computer 24 so as to morph the shape of the phased array 10 from one topology (linear, planar or volumetric) to another so as to allow for dynamic beam steering of the phased array 10.

In one example embodiment of the phased array 10, each electrolytic fluid antenna 12 comprises a computer-controlled valve which allows each electrolytic fluid antenna to be turned on or off. The electrolytic fluid antennas 12 that are turned on may be identical and may be fed with an equal amount of power and an appropriate progressive phase shift thereby enabling the construction of steerable directive patterns.

Figures 4A, 4B, 4C, 4D, 4E, 4F, 4G, 4H, 4I, 4J, 4K, 4L, 4M, 4N, 4O, 4P, 4Q, 4R:
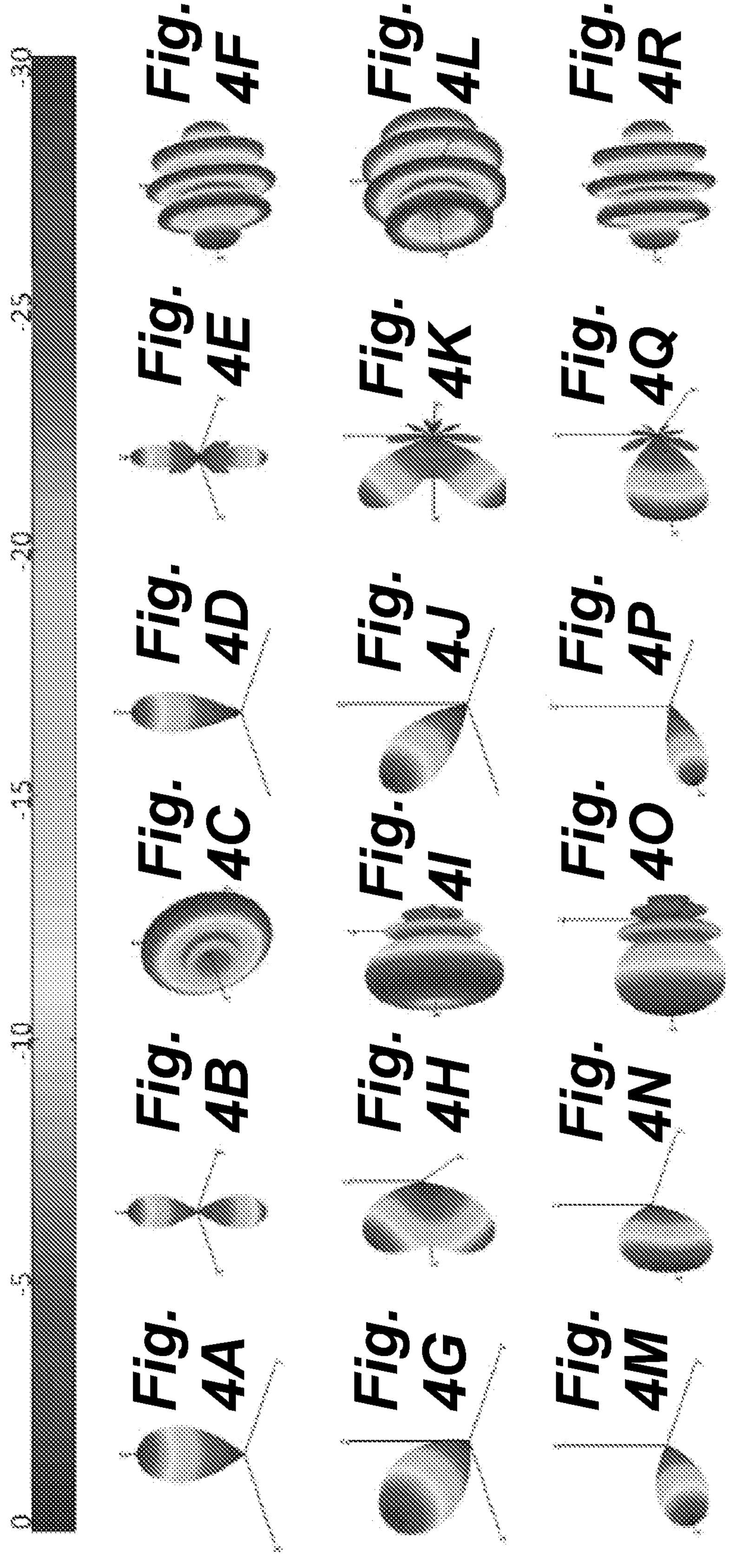
FIGS. 4A, 4B, 4C, 4D, 4E, 4F, 4G, 4H, 4I, 4J, 4K, 4L, 4M, 4N, 4O, 4P, 4Q, and 4R are example radiation patterns for different uniformly distributed phased array topologies.

FIGS. 4A through 4R are example radiation patterns for different uniformly distributed phased array topologies. FIG. 4A is a radiation pattern for a spherically distributed array configured with the proper phasing of its elements to scan a beam at the zenith angle (i.e., straight-up), θ=0° and ϕ=0°. FIG. 4B is a radiation pattern for a circularly distributed array configured, through the proper phasing of its constituent elements, to scan a beam at the zenith angle, at θ=0° and ϕ=0°. In reference to the pattern shown in FIG. 4B, due to the lack of depth of corresponding circularly distributed array, it creates an alias (i.e., undesired) beam at the angle θ=180° and ϕ=0°. FIG. 4C is a radiation pattern for a linearly distributed array which is configured to scan a beam at the zenith angle, at θ=0° and ϕ=0°. As can be seen, in FIG. 4C, due to the lack of depth and width of the example linearly distributed array, it creates an alias beam at the angle θ=0-180° and ϕ=90°. FIG. 4D is a radiation pattern for only the shell portion of the spherically distributed array of FIG. 4A. In other words, the spherically-distributed array used to create the radiation pattern in FIG. 4D differs from the spherically-distributed array used to create the radiation pattern in FIG. 4A in that no antenna elements are disposed within the sphere. Still referring to FIG. 4D, the constituent elements of the spherical shell array are appropriated phased so as to scan a beam at the zenith angle at θ=0° and ϕ=0°; and creates a single beam with no alias beam.

FIG. 4E is a representation of a radiation pattern for an annular distributed array embodiment of the phased array 10 where the constituent elements (i.e., the individual electrolytic fluid antennas 12) are properly phased so as to scan a beam at the zenith angle, at θ=0° and ϕ=0°. In reference to FIG. 4E, this radiation pattern has an alias beam at the angle θ=180° and ϕ=0°. FIG. 4F is a radiation pattern for a linear periodically distributed array embodiment of the phased array 10 with a greater than λ/2 spacing between elements. The linear periodically-distributed array embodiment of the phased array 10 may be configured through proper phasing of its constituent electrolytic fluid antennas 12 to scan a beam at the zenith angle, at θ=0° and ϕ=0°. However, as shown in FIG. 4F, due to this periodicity and a spacing greater than λ/2 along with not having depth and width of the distribution, the linear periodically-distributed array embodiment of the phased array 10 creates many undesirable beams with elevation angles spanning θ=0°−180° F. or various ϕ.

FIG. 4G is a representation of the radiation pattern of a spherically distributed array embodiment of the phased array 10, but scanned to θ=45° and ϕ=0°. FIG. 4H is a representation of a circularly distributed array embodiment of the phased array 10 scanned at θ=45° and ϕ=0°, and it is seen that the main beam and alias beam θ=135° and ϕ=0° are beginning to conjoin. FIG. 4I is a representation of the radiation pattern of a linearly distributed array embodiment of the phased array 10 scanned at θ=45° and ϕ=0° and it is seen that the main beam and alias beam θ=135° and ϕ=0° are beginning to conjoin. FIG. 4J is a representation of the radiation pattern of a spherical shell shape embodiment of the phased array 10 scanned at θ=45° and ϕ=0° and it is seen the pattern has a single beam due to its width, depth and length. FIG. 4K is a representation of the radiation pattern of the ring distributed array embodiment of the phased array 10 scanned at θ=45° and ϕ=0° and it is seen that the main beam and alias beam θ=135° and ϕ=0° are beginning to conjoin.

FIG. 4L is a representation of radiation pattern for the linear periodically distributed array embodiment of the phased array 10 where the elements are spaced apart greater than λ/2 and configured to scan a beam at the zenith angle, at θ=45° and ϕ=0°. Similarly to the radiation pattern shown in FIG. 4F, the radiation pattern shown in FIG. 4L has many undesirable beams with elevation angles spanning θ=0°–180° for various ¢ due to this periodicity and a spacing greater than λ/2. FIG. 4M is c the spherically distributed array embodiment of the phased array 10 scanned at θ=90° and ϕ=0° and it is seen a single beam still exists due to the array topology containing, width, length and depth of the constituent electrolytic fluid antennas 12. FIG. 4N is a representation of the radiation pattern of the circularly distributed array embodiment of the phased array 10 scanned at θ=90° and ϕ=0° where it is seen the main beam and alias beam have conjoined together into a single beam (fan-beam).

FIG. 4O is a representation of the radiation pattern of the linearly distributed array embodiment of the phased array 10 scanned at θ=90° and ϕ=0° where it is seen the main beam and alias beam have conjoined together into a single beam (spot-beam). FIG. 4P is a representation of the radiation pattern of the shell shape embodiment of the phased array 10 scanned at θ=90° and ϕ=0° and it is seen a single beam still exists due to the array topology containing, width, length and depth. FIG. 4Q is a representation of the radiation pattern of the annular distributed array embodiment of the phased array 10 scanned at θ=90° and ϕ=0° where it is seen the main beam and alias beam have conjoined together into a single beam (fan-beam). FIG. 4R is a representation of the radiation pattern of the linear periodically distributed array embodiment of the phased array 10 with spacing greater than λ/2 configured to scan a beam at the zenith angle, at θ=90° and ϕ=0°. The radiation pattern shown in FIG. 4R has many undesirable beams with elevation angles spanning θ=0°–180° for various ϕ.

Figure 5:
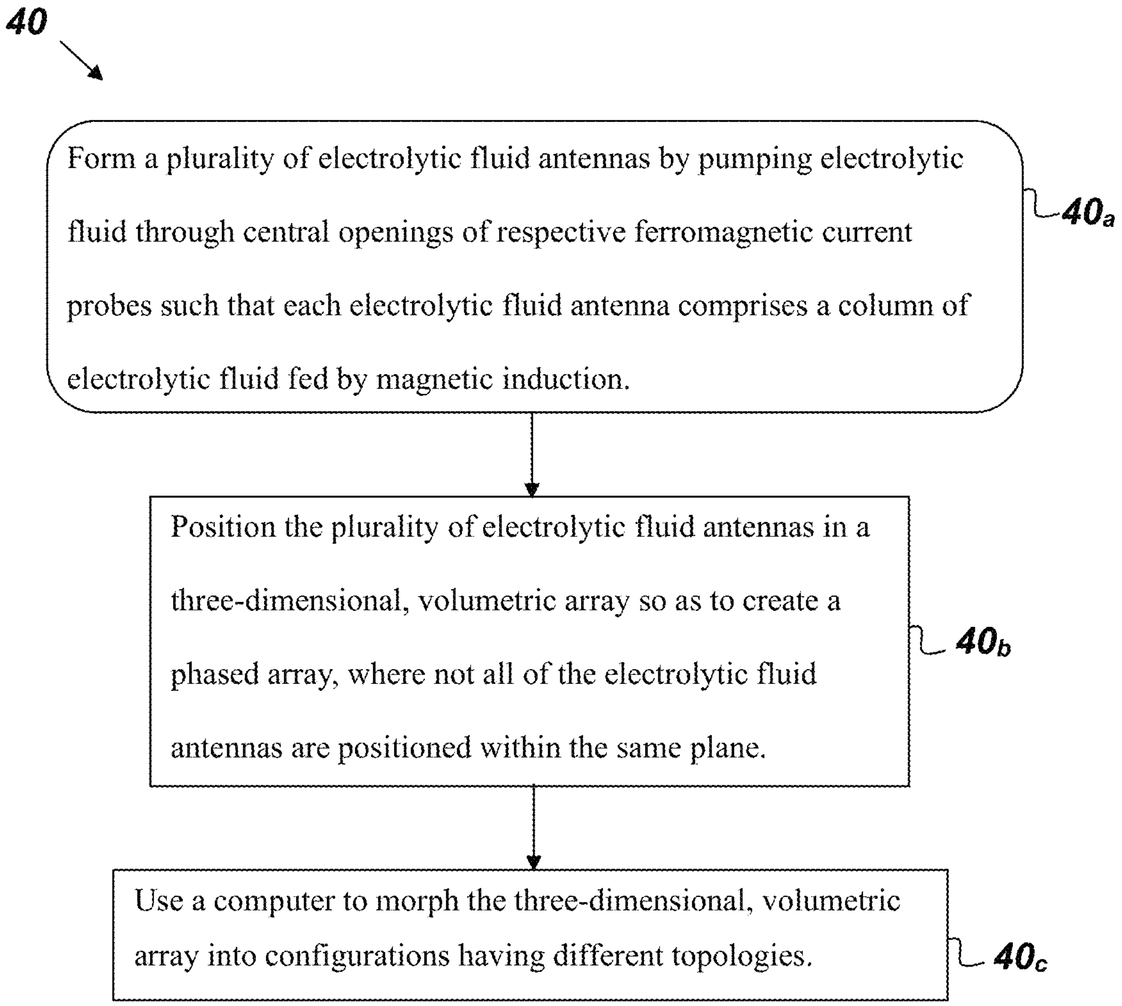
FIG. 5 is a flowchart.

FIG. 5 is a method 40 for dynamically beam steering a phased array of electrolytic fluid antennas comprising the following steps. The first step $\mathbf{40}_a$ provides for forming a plurality of electrolytic fluid antennas by pumping electrolytic fluid through central openings of respective ferromagnetic current probes such that each constituent electrolytic fluid antenna comprises a column of electrolytic fluid fed by magnetic induction. Another step $\mathbf{40}_b$ provides for positioning the plurality of electrolytic fluid antennas in a three-dimensional, volumetric array so as to create a phased array, where not all of the electrolytic fluid antennas are positioned within the same plane. Another step $\mathbf{40}_c$ provides for using a computer to morph the three-dimensional, volumetric array into configurations having different topologies. For example, a computer may be used to sequentially morph the three-dimensional, volumetric array into a line, a ring, a circle and a sphere so as to sample a transmitted wavefront. The computer may also be used to calculate one or more of an I/Q data pertaining to each topology, an in-phase signal, and a quadrature signal from an RF signal collected by the phased array of electrolytic fluid antennas. The computer may also be configured to generate sum and difference patterns associated with a given topology based on the I/Q data for the given topology. Then, one may find a direction of a received RF signal by dividing the difference pattern by the sum pattern.

An example of tracking a signal dividing the difference pattern by the sum pattern can be modeled by the computer for circular topology, ring (n=0), line (n=1), circle (n=2) and sphere (n=3) by using Equation 1 as follows:

$$e = \frac{\Delta}{\Sigma} = \frac{\text{difference voltage}}{\text{sum voltage}} = \frac{(Co\,\mathrm{Sin}\,c_n(\Psi))}{(\mathrm{Sin}\,c_n(\Psi))} = \frac{(H_{n/2}(\Psi))}{(J_{n/2}(\Psi))} = Co\,\mathrm{Tan}\,c_n(\Psi) \quad \text{Eq. 1}$$

where $H_n$ is a Struve function, $J_n$ is a Bessel function, ψ is an angular coordinate of a radiation pattern, and n represents the bounded topology. For instance, n=0 represents the ring topology, n=1 is the line topology, n=2 is the circle topology, and n=3 is the sphere topology.

When discussing aperiodic (random) phased arrays it may be desirable to find its mean or expected beam pattern in order to better illustrate its radiative characteristics. This may be done by taking the expectation of the beam pattern as follows:

$$\overline{U}(\vartheta, f) = \begin{matrix} 1/N + (1 - 1/N) \\ \neg\ 1/N = [\text{Pedestal}] \end{matrix} \left| \begin{matrix} \wedge(\zeta_x^r(\vartheta, f)) \wedge (\zeta_y^r(\vartheta, f)) \\ \wedge(\zeta_z^r(\vartheta)) \end{matrix} \right|^2 \quad \text{Eq. 2}$$

$$\neg\ \wedge = [\text{Main Lobe Factor}] = |\text{Characteristic Function}|^2$$

$$\zeta_x^r(\vartheta, \phi) = \hat{x} \cdot \cos(\tilde{\psi}),\ \zeta_y^r(\vartheta, \phi) = \hat{y} \cdot \cos(\tilde{\psi}),\ \tilde{A} = A/\lambda \quad \text{Eq. 3}$$

$$\zeta_z^r(\vartheta) = \hat{z} \cdot \cos(\tilde{\psi}),\ \cos(\tilde{\psi}) = 2\pi\tilde{A}(\hat{r}(\vartheta, \phi) - \hat{r}(\vartheta_0, \phi_0))$$

where A is the radius of a given topology. When discussing the array factor Ã, it is canonical to describe it in terms of $$\tilde{A} = \frac{A}{\lambda},$$

the effective aperture. Here, $\tilde{\psi}$ is the typical $\tilde{\psi}$ space from array analysis.

$$\zeta_x^r = \hat{x} \cdot \cos(\tilde{\psi}) \quad \text{Eq. 4}$$

$$\zeta_y^r = \hat{y} \cdot \cos(\tilde{\psi}) \quad \text{Eq. 5}$$

$$\zeta_z^r = \hat{z} \cdot \cos(\tilde{\psi}) \cos(\tilde{\psi}) = 2\pi\tilde{A}(\hat{r}(\theta, \phi) \cdot \hat{r}_0(\theta_0, \phi_0)) \quad \text{Eq. 6}$$

$$\hat{r}(\theta, \phi) = \sin\theta\cos\phi\hat{x} + \sin\theta\sin\phi\hat{y} + \cos\theta\hat{z} \quad \text{Eq. 7}$$

$$\hat{r}_0(\theta_0, \phi_0) = \sin\theta_0\cos\phi_0\hat{x} + \sin\theta_0\sin\phi_0\hat{y} + \cos\theta_0\hat{z} \quad \text{Eq. 8}$$

$\overline{U}(\theta, f)$ is the mean valued radiation pattern.

N is the number of elements (i.e., electrolytic fluid antennas 12 in the phased array.

^ is the characteristic function of the array topology.

$\zeta_x^r$ is the beam-steering function in the x direction.

$\zeta_y^r$ is the beam-steering function in the y direction.

$\zeta_z^r$ is the beam-steering function in the z direction.

θ is the elevation angle.

f is the frequency.

λ is the wavelength.

ψ is the typical ψ space from array analysis (just used $\tilde{\psi}$ not ψ for this so either one can be used).

ϕ is the azimuthal angle.

x̂ is a unit vector in the x direction.

ŷ is a unit vector in the y direction.

ẑ is a unit vector in the z direction.

r̂ is a unit vector in the z direction.

$\phi_0$ is the desired beam steering location in the azimuth location.

$\theta_0$ is the desired beam steering location in the elevation location.

Moreover, the term 1/N separates from the expression since integration is done over the entire distribution space. In other words, the cumulative distribution over the entire space is equal to one. The addition of the two patterns removes the negative spatial behavior. In other words, the addition of the difference and sum beam recreates a sum beam with greater beamwidth. This is beneficial when resolution is not required, and a large air space must be surveyed.

Antennas having omnidirectional radiation patterns, such as a monopole over a ground plane, may be used for phased array radar applications since they are capable of providing coverage in a 360-degree sector. The phased array 10 enables electrolytic fluid antennas to be used in phased arrays that are able to morph into multiple different geometries beyond traditional phased array geometries.

From the above description of the phased array 10 and the method 40 of dynamically beam-steering the same, it is manifest that various techniques may be used for implementing the concepts of the phased array 10 and the method 40 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the phased array 10 and the method 40 are not limited to the particular embodiments described herein, but are capable of many embodiments without departing from the scope of the claims.

We claim:

1. A method for dynamically beam-steering a phased array of electrolytic fluid antennas comprising:

forming a plurality of electrolytic fluid antennas by pumping electrolytic fluid through central openings of respective ferromagnetic current probes such that each electrolytic fluid antenna comprises a column of electrolytic fluid fed by magnetic induction;

positioning the plurality of electrolytic fluid antennas in a three-dimensional, volumetric array so as to create a phased array, wherein not all of the electrolytic fluid antennas are positioned within the same plane; and using a computer to morph the three-dimensional, volumetric array into configurations having different topologies; and modeling a topology distribution of the sensor array for circular topology, ring, line, circle and sphere according to the following equation:

$$e = \frac{\Delta}{\Sigma} = \frac{\text{difference voltage}}{\text{sum voltage}} = \frac{(Co\,\mathrm{Sin}\,c_n(\Psi))}{(\mathrm{Sin}\,c_n(\Psi))} = \frac{(H_{n/2}(\Psi))}{(J_{n/2}(\Psi))} = Co\,\mathrm{Tan}\,c_n(\Psi)$$

where $H_n$ is a Struve function, $J_n$ is a Bessel function, $\psi$ is an angular coordinate of a radiation pattern, and n represents the bounded topology such that n=0 represents the ring topology, n=1 represents the line topology, n=2 represents the circle topology, and n=3 represents the sphere topology.

2. The method of claim 1, wherein the topologies include at least one quadric surface.

3. The method of claim 1, wherein each column of electrolytic fluid comprises a free-standing stream of seawater pumped out of an ocean.

4. The method of claim 3, wherein at least two of the electrolytic fluid antennas are mounted to respective aerial vehicles.

5. The method of claim 4, further comprising using the computer to move the aerial vehicles with respect to each other so as to sequentially morph the three-dimensional, volumetric array into the following topologies: a line, a ring, a circle and a sphere.

6. The method of claim 5, further comprising using the computer to calculate I/Q data pertaining to each topology.

7. The method of claim 6, further comprising using the computer to calculate an in-phase signal and a quadrature signal from an RF signal collected by the array.

8. The method of claim 6, further comprising using the computer to generate sum and difference patterns associated with a given topology based on the I/Q data for the given topology.

9. The method of claim 8, further comprising finding a direction of a received RF signal by dividing the difference pattern by the sum pattern.

10. A method for dynamically beam-steering a phased array of electrolytic fluid antennas comprising:

forming a plurality of electrolytic fluid antennas by pumping electrolytic fluid through central openings of respective ferromagnetic current probes such that each electrolytic fluid antenna comprises a column of electrolytic fluid fed by magnetic induction;

positioning the plurality of electrolytic fluid antennas in a three-dimensional, volumetric array so as to create a phased array, wherein not all of the electrolytic fluid antennas are positioned within the same plane;

using a computer to morph the three-dimensional, volumetric array into configurations having different topologies;

wherein at least two of the electrolytic fluid antennas are mounted to respective aerial vehicles;

using the computer to move the aerial vehicles with respect to each other so as to sequentially morph the three-dimensional, volumetric array into the following topologies: a line, a ring, a circle and a sphere;

using the computer to generate sum and difference patterns associated with a given topology based on the I/Q data for the given topology;

finding a direction of a received RF signal by dividing the difference pattern by the sum pattern; and modeling a topology distribution of the sensor array for circular topology, ring, line, circle and sphere according to the following equation:

$$e = \frac{\Delta}{\sum} = \frac{\text{difference voltage}}{\text{sum voltage}} = \frac{(CoSinc_n(\Psi))}{(Sinc_n(\Psi))} = \frac{(H_{n/2}(\Psi))}{(J_{n/2}(\Psi))} = CoTanc_n(\Psi)$$

where $H_n$ is a Struve function, $J_n$ is a Bessel function, y is an angular coordinate of a radiation pattern, and n represents the bounded topology such that n=0 represents the ring topology, n=1 represents the line topology, n=2 represents the circle topology, and n=3 represents the sphere topology.

* * * * *